United States Patent
Prasad et al.

(10) Patent No.: US 12,450,736 B2
(45) Date of Patent: Oct. 21, 2025

(54) IDENTIFYING ABNORMAL IMAGES IN SET OF MEDICAL IMAGES BASED ON COMBINED FEATURE SET WITH GLOBAL FEATURES EXTRACTED USING FIRST CNN AND LOCAL FEATURES EXTRACTED USING SECOND CNN ANALYZING HIGH RESOLUTION IMAGE PATCHES

(71) Applicant: KONINKLIJKE PHILIPS N.V., Eindhoven (NL)

(72) Inventors: Vidya Madapusi Srinivas Prasad, Bangalore (IN); Srinivasa Rao Kundeti, Movva (IN); Manikanda Krishnan V, Bangalore (IN); Vijayananda Jagannatha, Bangalore (IN)

(73) Assignee: KONINKLIJKE PHLIPS N.V., Eindhoven (NL)

( * ) Notice: Subject to any disclaimer, the term of this patent is extended or adjusted under 35 U.S.C. 154(b) by 371 days.

(21) Appl. No.: 17/922,809

(22) PCT Filed: May 3, 2021

(86) PCT No.: PCT/EP2021/061525
§ 371 (c)(1),
(2) Date: Nov. 2, 2022

(87) PCT Pub. No.: WO2021/224162
PCT Pub. Date: Nov. 11, 2021

(65) Prior Publication Data
US 2023/0334656 A1    Oct. 19, 2023

(30) Foreign Application Priority Data
May 6, 2020  (EP) .................................... 20173286

(51) Int. Cl.
*G06T 7/00* (2017.01)
*G06T 3/4053* (2024.01)
(Continued)

(52) U.S. Cl.
CPC .......... *G06T 7/0012* (2013.01); *G06T 3/4053* (2013.01); *G06V 10/42* (2022.01);
(Continued)

(58) Field of Classification Search
CPC ................. G06T 7/0012; G06T 3/4053; G06T 2201/031; G06T 2207/10116;
(Continued)

(56) References Cited

U.S. PATENT DOCUMENTS 7,054,473 B1    5/2006  Roehrig
10,413,236 B2 *  9/2019  Aoyagi ................. G06T 7/0012
(Continued)

FOREIGN PATENT DOCUMENTS

| CN | 110472676 A | | 11/2019 |
|----|-------------|---|---------|
| KR | 20230060260 A | * | 5/2023 |
| KR | 20230147591 A | * | 10/2023 |

OTHER PUBLICATIONS

Lopes, U. K., and João Francisco Valiati. "Pre-trained convolutional neural networks as feature extractors for tuberculosis detection." Computers in biology and medicine 89, pp. 135-143 (Year: 2017).*

(Continued)

*Primary Examiner* — Scott A Rogers

(57) ABSTRACT

Disclosed herein is a method and system for identifying abnormal images in a set of medical images for optimal assessment of the medical images. A plurality of global features from each medical image is extracted based on pretrained weights associated with each global feature. Similarly, plurality of local features from each medical (Continued)

image is extracted analyzing a predefined number of image patches generated from a higher resolution image corresponding to each medical image. Further, an abnormality score for each medical image is determined based on weights associated with a combined feature set obtained by concatenating the plurality of global features and the plurality of local features. Thereafter, the medical image is identified as an abnormal image when the abnormality score of the medical image is higher than a predefined first threshold score.

15 Claims, 9 Drawing Sheets

(51) Int. Cl.

| | | |
|---|---|---|
| G06V 10/42 | (2022.01) | |
| G06V 10/44 | (2022.01) | |
| G06V 10/764 | (2022.01) | |
| G06V 10/774 | (2022.01) | |
| G06V 10/82 | (2022.01) | |
| G16H 30/40 | (2018.01) | |
| G16H 50/20 | (2018.01) | |

(52) U.S. Cl.
CPC ............ *G06V 10/44* (2022.01); *G06V 10/764* (2022.01); *G06V 10/774* (2022.01); *G06V 10/82* (2022.01); *G16H 30/40* (2018.01); *G16H 50/20* (2018.01); *G06T 2207/10116* (2013.01); *G06T 2207/20081* (2013.01); *G06T 2207/20084* (2013.01); *G06T 2207/30004* (2013.01); *G06V 2201/031* (2022.01)

(58) Field of Classification Search
CPC . G06T 2207/20081; G06T 2207/20084; G06T 2207/30004; G06V 10/42; G06V 10/44; G06V 10/764; G06V 10/774; G06V 10/82; G06V 2201/031; G16H 50/20; G16H 30/40
See application file for complete search history.

(56) References Cited

U.S. PATENT DOCUMENTS

| | | | | |
|---|---|---|---|---|
| 10,929,708 | B2* | 2/2021 | Syeda-Mahmood | ........................ G06T 7/0012 |
| 11,776,117 | B2* | 10/2023 | Guendel | ................ G16H 30/40 382/132 |
| 11,797,647 | B2* | 10/2023 | Laserson | ................ G16H 30/40 |
| 12,100,192 | B2* | 9/2024 | Bai | ........................ G06N 3/08 |
| 2009/0252395 | A1* | 10/2009 | Chan | ..................... G06T 7/0012 382/131 |
| 2016/0035078 | A1 | 2/2016 | Lin | |
| 2017/0147868 | A1 | 5/2017 | Sun | |
| 2022/0318565 | A1* | 10/2022 | Laserson | ................ G16H 30/40 |
| 2023/0274439 | A1* | 8/2023 | Preuhs | ..................... G06T 5/77 382/128 |
| 2024/0062367 | A1* | 2/2024 | Vdovjak | ............... G06T 7/0012 |

OTHER PUBLICATIONS

Tang, Yu-Xing, et al. "Automated abnormality classification of chest radiographs using deep convolutional neural networks." NPJ digital medicine 3(1), p. 70 (Year: 2020).*
Anwar, Syed Muhammad, et al. "Medical image analysis using convolutional neural networks: a review." Journal of medical systems 42, pp. 1-13. (Year: 2018).*
Yu, Hang, et al. "Convolutional neural networks for medical image analysis: state-of-the-art, comparisons, improvement and perspectives." Neurocomputing 444, pp. 92-110. (Year: 2021).*
International Search Report and Written Opinion Dated Jul. 15, 2021 For International Application No. PCT/EP2021/061525 Filed May 3, 2021.
Shaffie, et al: "A New System for Lung Cancer Diagnosis based on the Integration of Global and Local CT Features", 2019 IEEE International Conference on Imaging Systems and Techniques, Dec. 9, 2019.
Li, et al: "Deformation and Refined Features Based Lesion Detection on Chest X-Ray", IEEE Access, vol. 8, Jan. 2, 2020.
Zhang, et al.: "DP2 Block: An Improved Multi-Scale Block for Pulmonary Nodule Detection", 2020 IEEE 17th International Symposium on Biomedical Imaging Workshops, Apr. 4, 2020.
Kamnitsas, et al: "Efficient Multi-Scale 3D CNN with Fully Connected CRF for Accurate Brain Lesion Segmentation", Medical Image Analysis, 2016.
Litjens, et al: "A survey on deep learning in medical image analysis", Medical Image Analysis 42 (2017) 60-88.
Song: "Accurate Segmentation of Cervical Cytoplasm and Nuclei Based on Multiscale Convolutional Network and Graph", IEEE Transactions On Biomedical Engineering, vol. 62, No. 10, Oct. 2015.
Dong, et al: "Chest X-Ray Images from 16000+ Examples Using CNN", Connected Health: Applications, Systems and Engineering Technologies (CHASE), 2017 IEEE/ACM International Conference, Jul. 2017.
Guan, et al: "Diagnose like a radiologist: Attention guided convolutional neural network for thorax disease classification", CoRR, vol. abs/1801.09927, 2018.
Huang, et al: "Densely connected convolutional networks", Proceedings of the IEEE conference on computer vision and pattern recognition. Vol. 1. No. 2. (2017).
Van Griethuysen, et al: "Computational radiomics system to decode the radiographic phenotype", Cancer research 77.21 (2017): e104-e107.
Jaeger, et al: "Two public chest X-ray datasets for computer-aided screening of pulmonary dis- eases", Quantitative imaging in medicine and surgery 4, No. 6: 475., 2014.
Shiraishi, et al: "Development of a digital image database for chest radiographs with and without a lung nodule: receiver operating characteristic analysis of radiologists' detection of pulmonary nodules", American Journal of Roentgenology 174.1 (2000): 71-74.
Wang, et al: "Lung nodule classification using deep feature fusion in chest radiography", Computerized Medical Imaging and Graphics 57 (2017) 10-18.
Campadelli, et al: "Lung field segmentation in digital posteroanterior chest radiographs", Pattern Recognition and Image Analysis, Berlin, Heidelberg, Springer Berlin Heidelberg (2005) 736-745.
Quekel, et al: "Miss rate of lung cancer on the chest radiograph in clinical practice", Chest 115 (1999) 720-724.
Robinson, et al: "Variation between experienced observers in the interpretation of accident and emergency radiographs", The British journal of radiology 72 (1999) 323-330.
Kundel: "Perception errors in chest radiography. In: Seminars in Respiratory Medicine", vol. 10., Copyright 1989 by Thieme Medical Publishers, Inc. (1989) 203-210.
Renfrew, et al: "Error in radiology: classification and lessons in 182 cases presented at a problem case conference", . Radiology 183 (1992) 145-150.
Jackson, W.L.: "In radiology, turnaround time is king", (2015) https://www.diagnosticimaging.com/view/radiology-turnaround-time-king.
He, et al: "Deep residual learning for image recognition", Proceedings of the IEEE conference on computer vision and pattern recognition. (2016) 770-778.
Krizhevsky, et al: "ImageNet classification with deep convolutional neural networks. In: Advances in neural Information processing systems", (2012) 1097-1105.
Shin, et al: "Learning to read chest x-rays: Recurrent neural cascade model for automated image annotation", In: Proceedings of the IEEE Conference on Computer Vision and Pattern Recognition. (2016) 2497-2506.
Zhu, et al: "Deep multi-instance networks with sparse label assignment for whole mammogram classification" . In: International

(56) References Cited

OTHER PUBLICATIONS

Conference on Medical Image Computing and Computer-Assisted Intervention, Springer (2017) 603-611.
Rajpurkar, et al: "Chexnet: Radiologist-level pneumonia detection on chest x-rays with deep learning", arXiv preprint arXiv:1711.05225 (2017).
Wang, et al: "Chestx-ray8: Hospital-scale chest x-ray database and benchmarks on weakly-supervised classification and localization of common thorax diseases", In: 2017 IEEE Conference on Computer Vision and Pattern Recognition (CVPR), IEEE (2017) 3462-3471.
Hwang, et al: "Self-transfer learning for fully weakly supervised object localization", arXiv preprint arXiv:1602.01625 (2016).
Islam, et al: "Abnormality detection and localization in chest x-rays using deep convolutional neural networks", arXiv preprint arXiv:1705.09850 (2017).
Kumar, et al: "Boosted cascaded convnets for multilabel classification of thoracic diseases in chest radiographs", In: International Conference Image Analysis and Recognition, Springer (2018) 546-552.
Kumar, et al: "Distinguishing normal and pulmonary edema chest x-ray using gabor filter and svm", In: Bioelectronics and Bioinformatics (ISBB), 2014 IEEE International Symposium on, IEEE (2014) 1-4.
Kingma, et al: "A method for stochastic optimization", . arXiv preprint arXiv:1412.6980 (2014).
Selvaraju, et al: "Grad-CAM: Visual Explanations from Deep Networks via Gradient-Based Localization" ICCV. 2017.

\* cited by examiner

IDENTIFYING ABNORMAL IMAGES IN SET OF MEDICAL IMAGES BASED ON COMBINED FEATURE SET WITH GLOBAL FEATURES EXTRACTED USING FIRST CNN AND LOCAL FEATURES EXTRACTED USING SECOND CNN ANALYZING HIGH RESOLUTION IMAGE PATCHES

CROSS REFERENCE TO RELATED APPLICATIONS

This application is the U.S. National Phase application under 35 U.S.C. § 371 of International Application No. PCT/EP2021/061525 filed May 3, 2021, which claims the benefit of European Patent Application Number 20173286.4 filed May 6, 2020. These applications are hereby incorporated by reference herein.

FIELD OF THE INVENTION

The present subject matter is, in general, related to the field of image processing techniques, and more particularly, but not exclusively, to a method and system for identifying abnormal images in a set of medical images.

BACKGROUND OF THE INVENTION

Medical images, for example, Chest X-rays (CXR), are one of the first choices for diagnosis and are fundamental to many patient pathways, revealing some unsuspected pathologic alterations. Generally, the medical images are reviewed by trained radiologists and the reviewing heavily depends on the experience and expertise of the radiologists. Presently, the radiologists face various challenges with the complexity of interpretation of the medical images.

Some of the challenges faced by the radiologists may be attributed to presence of anatomical noise in the images caused by superimposition of thoracic structures, similarity in radiographic appearances of some diseases, and subtlety of some pathologies which are indistinguishable. Other challenges may be in terms of time, where each trained radiologist takes several minutes to review a single medical image and write a report. Also, many radiologists have to work over-time, which in turn may increase the chances of misdiagnosis due to exhaustion. Additionally, in a comparative study of casualty plain radiographs, there may be a significant disagreement of diagnosis, which constitutes 5%-9% of the total reviews. Due to this, the presence of an abnormality may, more likely, give rise to observer variations. Such variations may be classified as perceptual or cognitive. Perceptual errors occur when the image features, though recorded, were not appreciated by a reviewer. Cognitive errors may lead to either false positive or false negative reporting. Thus, there is a necessity to automate the image analysis process.

However, the existing automated systems face numerous challenges in terms of learning and analysis. For example, to train an automated computer aided diagnosis system, a high quality and larger magnitude dataset may be needed. On the larger data sets, the labelling of images may be normal or abnormal and may not be very accurate since the labelling process is automated by reading of radiology reports by a Natural Language Processing (NLP) based algorithm. In doing so, an additional layer of error may be introduced into the ground truth. Also, most of the existing automated systems focus on extracting and generalizing global features like boundary, shape, edge properties of region of interests and does not focus on classifying the normal and abnormal images.

Thus, presently, there is a need for an automated image analysis system which addresses the issues discussed above and results in optimal assessment of the medical images.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

Disclosed herein is a method for identifying abnormal images in a set of medical images for optimal assessment of the medical images. The term "abnormal images" refers to medical images that show any condition that is clinically diagnosed as not normal. For example, when an image shows presence of pneumonia, nodules etc. in a medical image, such image is an abnormal image and shows abnormality in one or more organs of a patient. The method comprises extracting a plurality of global features from each medical image of the set of medical images based on pretrained weights associated with each of the plurality of global features. The medical image is characterized by a baseline resolution. Further, the method comprises extracting a plurality of local features from each medical image by analyzing a predefined number of image patches corresponding to each medical image. The local features are extracted using a pre-determined weights that are determined using CNN. The predefined number of image patches are generated by obtaining a higher resolution image corresponding to each medical image and splitting each higher resolution image. Higher resolution refers to a resolution that is greater/higher than the baseline resolution of the medical image. High resolution image is generated by up-sampling the medical image or a part of the medical image. Upon extracting the plurality of local features, the method comprises determining an abnormality score for each medical image based on weights associated with a combined feature set obtained by concatenating the plurality of global features and the plurality of local features. The abnormality score is determined using a pretrained feature classifier. Finally, the method comprises identifying the medical image as an abnormal image when the abnormality score of the medical image is higher than a predefined first threshold score.

Further, the present disclosure relates to an automated assessment system for identifying abnormal images in a set of medical images for optimal assessment of the medical images. The automated system comprises a processor and a memory. The memory is communicatively coupled to the processor and stores processor-executable instructions, which on execution, cause the processor to extract a plurality of global features from each medical image of the set of medical images based on pretrained weights associated with each of the plurality of global features. Further, the instructions cause the processor to extract a plurality of local features from each medical image by analyzing a predefined number of image patches corresponding to each medical image. The predefined number of image patches are generated by obtaining a higher resolution image corresponding to each medical image and splitting each higher resolution image. Thereafter, the instructions cause the processor to determine an abnormality score for each medical image based on weights associated with a combined feature set obtained by concatenating the plurality of global features and the plurality of local features. The abnormality score is determined using a pretrained feature classifier. Finally, the instructions cause the processor to identify the medical image as an abnormal image when the abnormality score of the medical image is higher than a predefined first threshold score.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
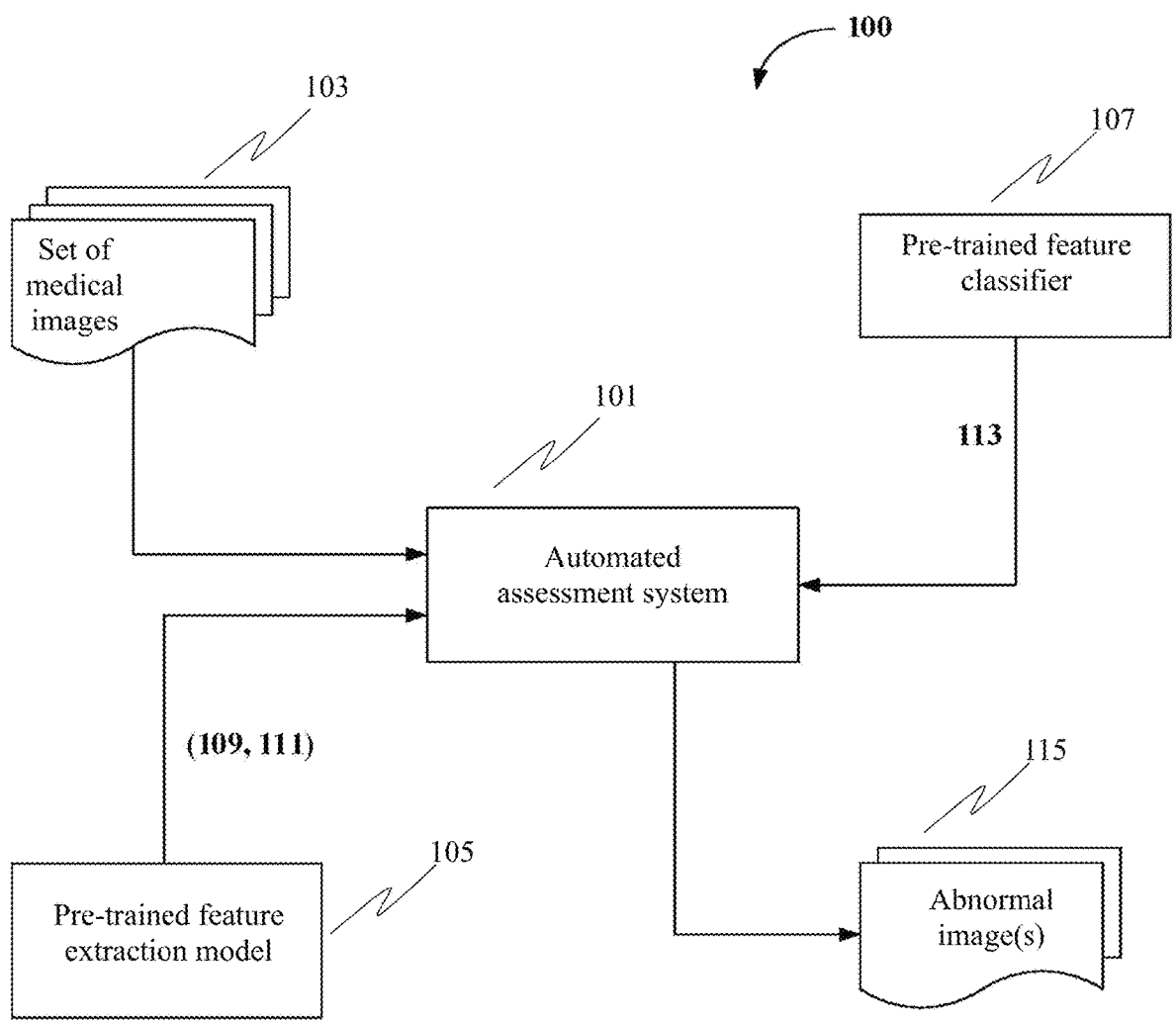
FIG. 1 illustrates an exemplary architecture for identifying abnormal images in a set of medical images for optimal assessment of the medical images in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION OF EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In an embodiment, the method and automated assessment system of the present disclosure may be used in hospitals and medical institutions for more accurate diagnosis of patients using medical images such as, Chest X-Ray (CXR) of the patients. Additionally, the method and the automated assessment system of the present disclosure may be used for generating an optimized worklist assignment for expert reviewers/radiologists for aiding and improving diagnosis, and for optimally utilizing time of the expert reviewers/radiologists.

In an embodiment, the present disclosure focuses on improving binary classification performance during automated image analysis. The classification performance may be improved by considering local fine aspects in an image and with improved label consistency. Accordingly, the present disclosure discloses extracting image biomarkers from the medical images and then performing binary classification on the input medical images to classify them as 'normal' or an 'abnormal' image. The term "normal image" refers to images that show absence of a clinical medical condition. The term "abnormal image" refers to a medical image that show any condition that is clinically diagnosed as not normal. For example, when an image shows presence of pneumonia, nodules etc. in a medical image, such image is an abnormal image and shows abnormality in one or more organs of a patient. Additionally, the present disclosure uses a selective sampler for cleaning of noisy labels in the input medical images during training of an image classification unit in the automated assessment system. This helps in further enhancing the classification accuracy and performance.

In an embodiment, the present disclosure proposes a principled method for worklist assignment, where only the difficult and/or high priority diagnosis cases may be assigned to the expert/experienced radiologists. This ensures optimal utilization of the highly experienced and skilled radiologists' time.

In an embodiment, the worklist assignment for ensuring the optimal utilization of the expert time may be dependent on the accuracy of the automated assessment system itself. The present disclosure addresses the above issue by extracting local features from a patch of a high-resolution image and combining it with the global features of the image extracted from a low-resolution image. By doing so, both the high-level edge information, as well as the minute details are captured and used for analysis, which improves the performance and reduces false diagnosis and reporting of the medical images. That is, the accurate classification of the images also helps in reducing number of false negatives (that is, an abnormal image getting classified as a normal image) during the automated assessment of the medical images.

Moreover, the existing deep-learning analysis models, which analyze solely based on the high-resolution image samples, may have memory constraints and experience challenges due to higher image size of the high-resolution images used for the analysis. Also, each feature that needs to be reviewed from the images must be exhaustively framed and labelled by an expert at the training stage, which is a very challenging task for the expert. On the other hand, even with an exhaustive feature set, using only the lower-resolution images may provide inaccurate results since the finest details on the images may be missed out during the analysis. The present disclosure aims to address the above issues by using a combination of the global high-resolution images and the corresponding down-scaled lower resolution images. The lower resolution refers to resolution that is lower than the baseline resolution. Lower resolution images are generated by down-sampling the medical images.

In an embodiment, the present disclosure additionally uses a two-step sampling mechanism for cleaning a subset of the noisy labels, in order to eliminate inaccuracy in the labelling, thereby improving consistency in the labelling of the images as normal or abnormal and improving the performance of the image classifier.

In an embodiment, the present disclosure also provides a provision for junior and/or inexperienced radiologists to view additional review areas and review information from the automated assessment system. Therefore, when in doubt, the inexperienced radiologist may request and use the additional review information before final reporting and diagnosis.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture for identifying abnormal images 115 in a set of medical images 103 for an optimal assessment of the medical images 103 in accordance with some embodiments of the present disclosure.

The environment 100 may include, without limitation, an automated assessment system 101. Further, the automated assessment system 101 may be associated with a pre-trained feature extraction model 105 and a pre-trained feature classifier 107. In an embodiment, the automated assessment system 101 may be a computing device including, without limitation, a desktop computer, a laptop, a Personal Digital Assistant, smartphone or any other device capable of performing the functions in accordance with embodiments of the present disclosure for identifying abnormal images 115 from a set of medical images 103 (alternatively referred as medical images 103). In an implementation, the automated assessment system 101 may be deployed in hospitals and/or medical institutions for aiding in diagnosis and reporting of the medical images 103. In an implementation, the pre-trained feature extraction model 105 and the pre-trained feature classifier 107 may be configured and stored within the automated assessment system 101.

In an embodiment, the automated assessment system 101 may be configured to receive the medical images 103 from an image source, which need to be analysed for identifying abnormal images 115. In one embodiment, the image source may be a physical storage/repository or a storage server that stores a plurality of medical images to be analysed. In another embodiment, the image source may be an image capturing unit such as, without limiting to, an X-Ray machine, a Computed Tomography (CT) scanner and the like, from which a plurality of medical 103 images may be received in real-time. In an embodiment, the medical images 103 may be visual representations of an internal organ/part of a person/patient, used for clinical analysis and diagnosis of the person/patient. As an example, the medical images 103 may include, without limiting to, X-Ray images, CT scans, ultrasound images and the like. In an implementation, the image source, as disclosed above, may be configured as a part of the automated assessment system 101. The resolution of the medical images 103 as received from the imaging devices or from storage devices is referred to as baseline resolution of the medical images 103.

In an embodiment, upon receiving the set of medical images 103, the automated assessment system 101 may extract a plurality of global features 109 from each medical image of the set of medical images 103 based on pretrained weights associated with each of the plurality of global features 109. As an example, the global features 109 of the medical images 103 may include high-level morphological features such as, without limiting to, boundary of a Region of Interest (RoI) within the medical image, shape of the RoI and edges of the RoI or the medical image. In an embodiment, the plurality of global features 109 may be extracted from lower resolution images of the medical images 103. The lower resolution images have a resolution lower than the baseline resolution of the medical images 103.

In an embodiment, once the plurality of global features 109 are extracted, the automated assessment system 101 may extract a plurality of local features 111 from each medical image of the set of medical images 103. The plurality of local features 111 may be extracted by analysing a predefined number of image patches corresponding to the medical images 103. In an embodiment, the predefined number of image patches may be generated by obtaining a higher resolution image corresponding to each medical image and then splitting the higher resolution images into the predefined number of smaller patches. The higher resolution images have a resolution higher than the baseline resolution of the medical images 103. The predefined number, for example, may be 16, which means that each medical image is split into 16 image patches and each of the 16 image patches are analysed for extracting the plurality of local features 111. As an example, the plurality of local features 111 may include finer details of the medical images 103 and/or the RoI within the medical images 103 and may include, without limiting to, texture of the RoI, pattern of the RoI and the like.

In an embodiment, after extracting the plurality of global features 109 and the plurality of local features 111 from each of the medical images 103, the automated assessment system 101 may form a combined feature set of the features by concatenating the plurality of global features 109 and the plurality of local features 111. Further, the automated assessment system 101 may determine an abnormality score 113 for each of the medical images 103 based on weights associated with the combined feature set. Here, the weights for the combined feature set may be assigned using the pretrained feature classifier 107 associated with the automated assessment system 101.

In an embodiment, the plurality of global features 109 and the plurality of local features 111 may be extracted using the pre-trained feature extraction model 105 associated with the automated assessment system 101. The pretrained feature extraction model 105 may be trained with a plurality of train medical images and corresponding ground truth labels prior to real-time analysis of the medical images 103 by the automated assessment system 101. The train medical images are the medical images used for training the automated assessment system 101. The training, testing and implementation of the pre-trained feature extraction model 105 is described in further section of the description.

In an embodiment, after determining the abnormality score 113, the automated assessment system 101 may identify one or more of the set of medical images 103 as an abnormal image 115 when the abnormality score 113 of the medical image is higher than a predefined first threshold score. Here, the predefined first threshold score may be set by an expert and/or a radiologist operating the automated assessment system 101. As an example, the predefined first threshold score may be a value between 0 and 1, such as 0.4. In one embodiment, each medical image 103, whose abnormality score 113 is higher than 0.4 may be identified and categorized as the abnormal image 115. In an embodiment, the abnormal image 115 may be a medical image that requires an expert analysis and/or that needs to be analysed by an experienced radiologist for a correct diagnosis and reporting of the medical image. In other words, the abnormal image 115 may be a complex/difficult case for the automated assessment system 101, such that the automated assessment system 101 finds it difficult to make an accurate diagnosis of the medical image.

In an embodiment, each medical image in the set of medical images 103 may be classified into two classes/categories of the abnormal images 115 as per the following arrangement. The first category of the abnormal images 115 may be a 'highly likely to be abnormal and hence critical' category. As an example, the medical images 103 whose abnormality score 113 is higher than 0.8 may be assigned to this category and flagged as a critical abnormal image. The second category of the abnormal images 115 may be the 'questionable images' and/or 'difficult cases', where it may be challenging for a radiologist to determine whether or not the case is normal, and hence are error prone, especially when being assessed by the junior radiologists. As an example, the medical images 103 having very small regions of abnormality may be grouped under the second category of the abnormal images 115 and tagged as a challenging abnormal image.

In an embodiment, by identifying and classifying the abnormal images 115 into the first and the second category of the abnormal images 115, the automated analysis system 101 ensures that a most appropriate assessment strategy is followed during analysis of the abnormal images 115. That is, the automated assessment system 101 intelligently decides when an expert involvement is required for correct analysis of the medical image. As a result, the automated assessment system 101 ensures optimal usage of time of the expert analysts and improves accuracy of the analysis as well.

Figure 2:
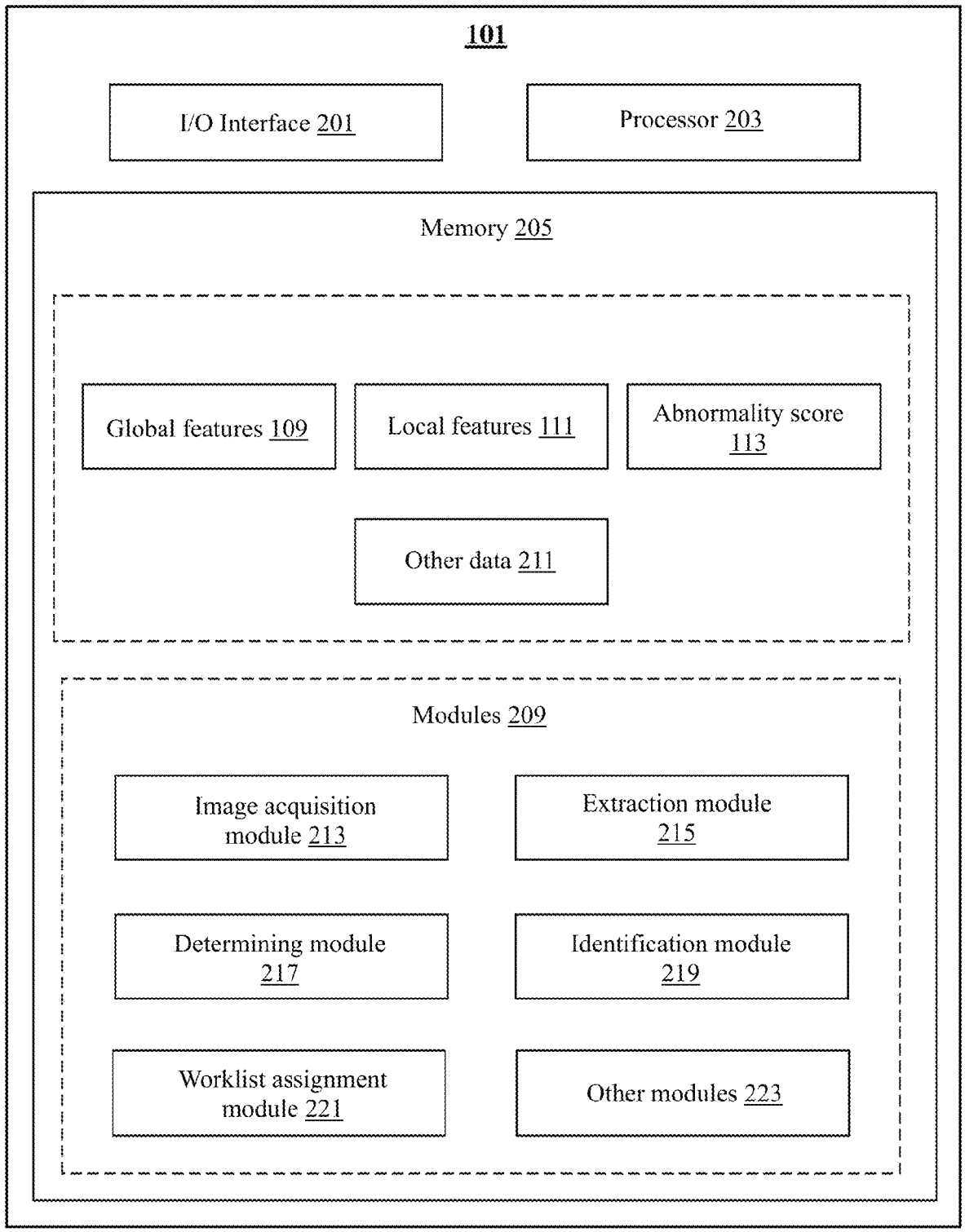
FIG. 2 shows a detailed block diagram illustrating an automated assessment system for identifying abnormal images in a set of medical images in accordance with some embodiments of the present disclosure.

FIG. 2 shows a detailed block diagram illustrating an automated assessment system 101 for identifying abnormal images 115 in a set of medical images 103 in accordance with some embodiments of the present disclosure.

In an implementation, the automated assessment system 101 may include an I/O interface 201, a processor 203, and a memory 205. The I/O interface 201 may be communicatively interfaced with an image repository and/or an image source for receiving a set of medical images 103 to be analyzed by the automated assessment system 101. The processor 203 may be configured to perform each of one or more functions of the automated assessment system 101. In an embodiment, the memory 205 may be communicatively coupled to the processor 203.

In some implementations, the image segmentation system 101 may include data 207 and modules 209 for performing various operations in accordance with the embodiments of the present disclosure. In an embodiment, the data 207 may be stored within the memory 205 and may include, without limiting to, global features 109, local features 111, abnormality score 113 and other data 211.

In some embodiments, the data 207 may be stored within the memory 205 in the form of various data structures. Additionally, the data 207 may be organized using data models, such as relational or hierarchical data models. The other data 211 may store temporary data and temporary files, generated by the modules 209 while performing various functions of the automated assessment system 101. As an example, the other data 211 may include, without limiting to, pretrained weights associated with the global features 109, image patches, a combined feature set of the features and values of first threshold score and second threshold score.

In an embodiment, the data 207 may be processed by one or more modules 209 of the automated assessment system 101. As used herein, the term module refers to an Application Specific Integrated Circuit (ASIC), an electronic circuit, a processor (shared, dedicated, or group) and memory that execute one or more software or firmware programs, a combinational logic circuit, a specialized hardware unit and/or other suitable components that provide the described functionality. In an embodiment, the other modules 231 may be used to perform various miscellaneous functionalities of the automated assessment system 101. It will be appreciated that such modules 209 may be represented as a single module or a combination of different modules.

In one implementation, the one or more modules 209 may be stored as instructions executable by the processor 203. In another implementation, each of the one or more modules 209 may be separate hardware units, communicatively coupled to the processor 203 for performing one or more functions of the automated assessment system 101. The one or more modules 209 may include, without limiting to, an image acquisition module 213, an extraction module 215, a determining module 217, an identification module 219, a worklist assignment module 221 and other modules 223.

In an embodiment, the image acquisition module 213 may be configured for acquiring/receiving the set of medical images 103 from the image source associated with the automated assessment system 101.

In an embodiment, the extraction module 215 may be configured for extracting the plurality of global features 109 and the plurality of local features 111 from the set of medical images 103. In an embodiment, the extraction module 215 may be interfaced with the pre-trained feature extraction model 105, which aids in extracting the plurality of the global features 109 and the local features 111 from the medical images 103.

In an embodiment, the determining module 217 may be configured for determining the abnormality score 113 for each of the medical images 103. The determining module 217 may be interfaced with the pretrained feature classifier 107, which determines weights for each feature in a combined feature set of the plurality of global features 109 and the plurality of local features 111.

In an embodiment, the identification module 219 may be configured for identifying the abnormal images 115 among the set of medical images 103. In an embodiment, the identification module 219 may compare the abnormality score 113 of each of the medical images 103 with the predefined first threshold score and may categorize the medical images 103 whose abnormality score 113 is higher than the predefined first threshold score as the abnormal image 115.

In an embodiment, the worklist assignment module 221 may be configured for dynamically generating a worklist to be assigned for an expert radiologist for expert analysis of the abnormal images 115. The worklist may comprise one or more medical images 103 identified as abnormal images 115, along with the information related to the category of the abnormal images 115 to which each of the abnormal images 115 belong (that is, either critical abnormal image or a challenging abnormal image). In an embodiment the worklist may be continuously updated with the newly identified abnormal images 115.

Figure 3:
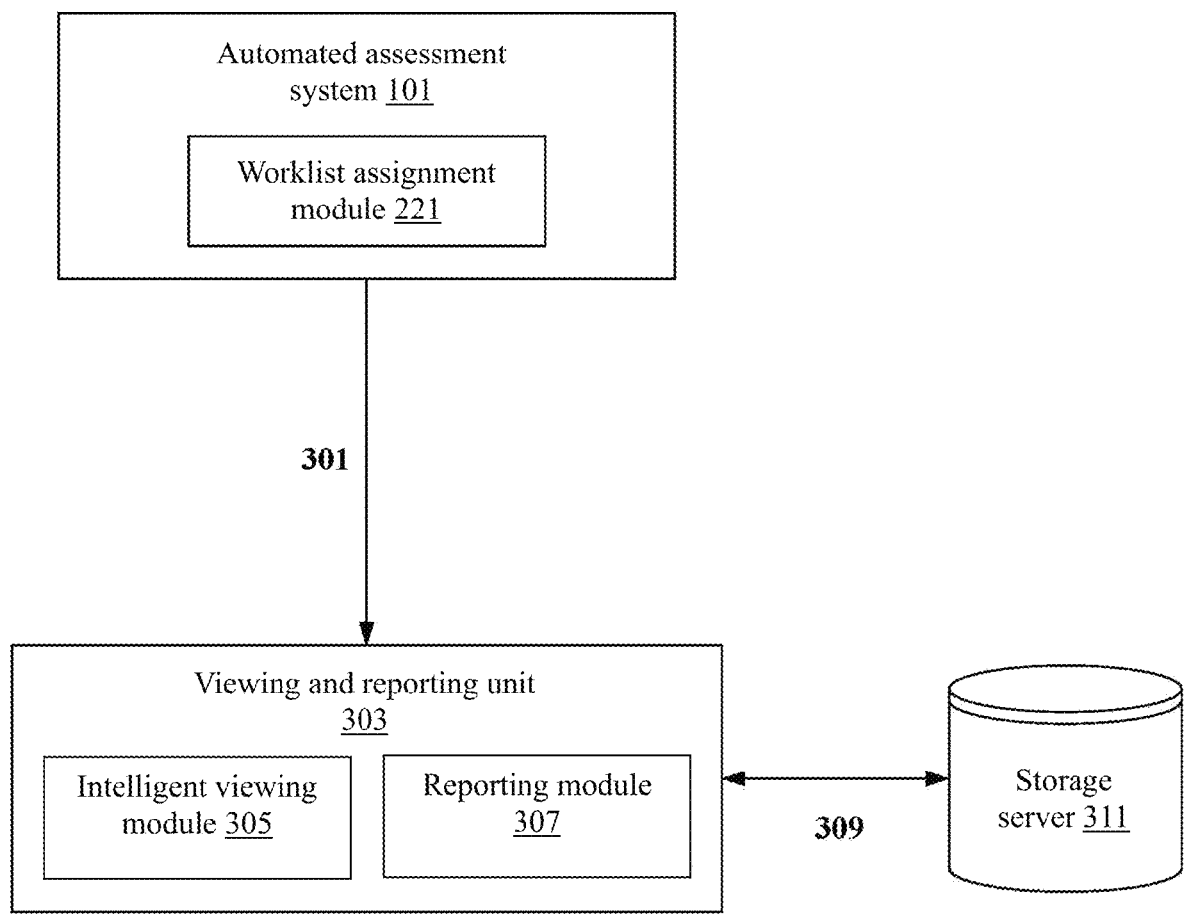
FIG. 3 shows a block diagram illustrating reporting of the abnormal images in accordance with an embodiment of the present disclosure.

FIG. 3 shows a block diagram illustrating reporting of abnormal images 115 in accordance with an embodiment of the present disclosure.

In an embodiment, once an updated worklist 301 is generated at the automated assessment system 101, the updated worklist 301 may be provided to a viewing and reporting unit 303, associated with the automated assessment system 101, for proper reporting of the abnormal images 115 comprised in the updated worklist 301. In other words, an expert and/or an experienced reviewer may retrieve the updated worklist 301 from the automated assessment system 101 through the viewing and reporting unit 303. In an embodiment, the viewing and reporting unit 303 may comprise, without limiting to, an intelligent viewing module 305 and a reporting module 307. Using the intelligent viewing module 305, the expert reviewer may get additional information related to the abnormality score 113 of the abnormal images 115 and specially highlighted review areas within the abnormal images 115. In an embodiment, the additional information may be displayed on a display screen/user interface associated with the automated assessment system 101. Here, the expert reviewer may perform various operations such as, without limitation, zooming in/out of the highlighted review areas, changing views/angle of the review areas and the like, for an easy review of the abnormal image 115.

With the additional information, the expert reviewer may instantly focus on the highlighted review areas for analysing the abnormal images 115. Once the analysis is complete, the expert reviewer may generate a report for each of the abnormal images 115 using the reporting module 307. Further, the generated reports 309 may be stored on a storage server 311.

In an implementation, the storage server may be communicatively interfaced with the automated assessment system 101. The automated assessment system 101 may refer to the expert reports 309 stored on the storage server 311 for learning and improving decisions on identifying the abnormal images 115 from the set of medical images 103. Thus, the expert reports 309 stored on the storage server 311 may form a part of the training data set used for training the automated assessment system 101.

In an embodiment, the automated assessment system 101 may be trained in two stages. The first stage training may be before starting analysis of the medical images 103, which is performed with the help of train medical images and associated ground truth labels. The second stage training may be corrective in nature and may be performed after the automated assessment system 101 has analysed a number of train medical images. For example, the second stage training may be performed based on expert comments and inputs on the analysis reports 309 of the automated assessment system 101, received from the expert reviewers.

Figure 4:
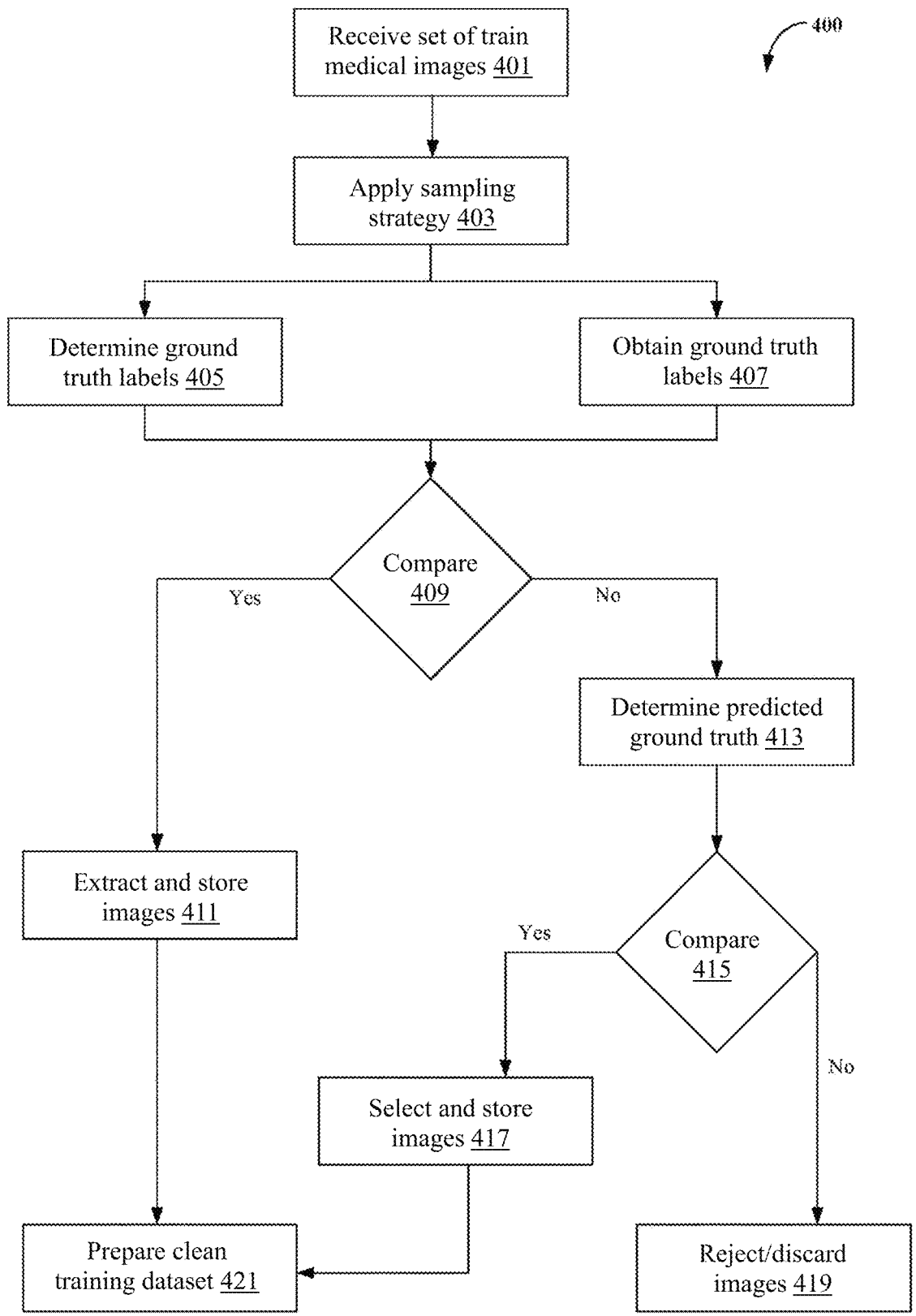
FIG. 4 shows a flowchart illustrating a method of preparing a clean training data set of the medical images in accordance with some embodiments of the present disclosure.

FIG. 4 shows a flowchart illustrating a method of preparing a clean training data set of the train medical images, for training the automated assessment system 101 in accordance with some embodiments of the present disclosure.

At block 401, the automated assessment system 101 may receive a set of train medical images (I) 103 and the corresponding ground truth labels (G) from an image source associated with the automated assessment system 101. The ground truth labels for the train medical images (I) may be assigned by the expert reviewers, before the train medical images (I) are sent to the automated assessment system 101. In an embodiment, in order to enhance quality of the training data set and to increase accuracy of the automated assessment system 101, a sampling strategy is applied on the set of medical images (I) for eliminating noisy labels in the set of train medical images (I). In other words, the sampling strategy helps in determining goodness of the ground truth labels associated with the set of medical images (I).

In an embodiment, as shown in block 403, the sampling strategy may be applied on a selected subset $(I_M)$ of the set of train medical images (I). Further, at block 405, the ground truth labels $(G_M)$ for the images in the subset $(I_M)$ may be determined, for example, by using a Natural Language Processing (NLP) technique configured in the automated assessment system 101. Further, at block 407, the ground truth labels $(R_M)$ for the subset of images $(I_M)$ may be obtained by manual analysis of the subset of images $(I_M)$ by expert radiologists. That is, for the same subset of images $(I_M)$, two different sets of ground truth labels $(G_M)$ and $(R_M)$ may be obtained. Thereafter, as shown in block 409, the ground truth labels $(G_M)$ may be compared with the corresponding ground truth labels $(R_M)$ to determine a match between the ground truth labels $(G_M)$ and $(R_M)$. That is, a one-to-one comparison between the ground truth labels $(G_M)$ and $(I_M)$ for the corresponding images may be drawn to determine a consensus between the ground labels obtained from the automated NLP analysis and the manual expert analysis.

In an embodiment, the consensus may be defined as the total number of matches in the labels between $(G_M)$ and $(R_M)$ to the total number of images in the subset of images $(I_M)$. If the consensus ratio is greater than a threshold 'T', which may be defined by the user of the automated assessment system 101, for a given class 'c', then set of all images (from I) of the class 'c' may be said to be in consensus. Subsequently, at block 411, all the images ($I_{NS}$), from all the classes having consensus, and the corresponding ground truth labels ($G_{NS}$), whose consensus match, may be extracted and stored in the clean training dataset (D').

On the other hand, for the remaining images ($I_S$), from all the classes of 'I' that do not have consensus, and the corresponding ground truth labels (Gs), predictive ground truth labels (Ps) may be determined using a sampling classifier, as shown in block 413. Thereafter, at block 415, the predictions (Ps) may be compared with the corresponding ground truth labels ($G_s$) for determining a consensus between the labels (Ps) and ($G_s$). Further, the images whose predicted labels (Ps) match with the corresponding ground truth labels ($G_s$), may be selected and stored as a part of the training dataset (D'), as shown in block 417. Alternatively, the images whose ground truth labels do not match and/or not in consensus, may be rejected/discarded and not used for training the automated assessment system 101, as shown in block 419. Finally, at block 421, the clean training dataset (D') may be prepared using the images and the ground truth labels selected at blocks 411 and 417.

Figure 5:
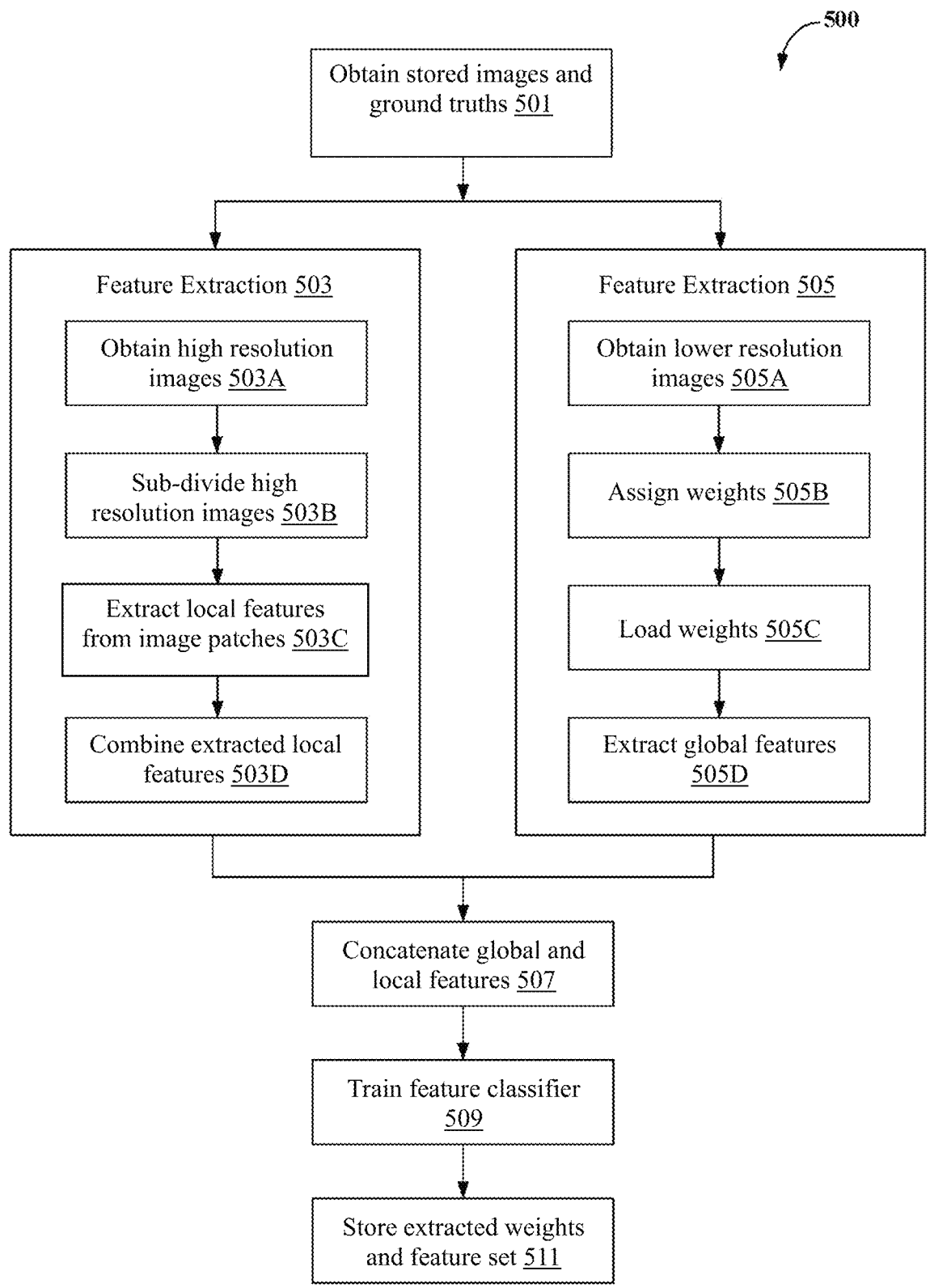
FIG. 5 shows a flowchart illustrating a method of extracting local and global features from the medical images in accordance with some embodiments of the present disclosure.

FIG. 5 shows a flowchart illustrating a method of extracting the plurality of local features 111 and the plurality of global features 109 for training the pre-trained feature extraction model 105 in accordance with some embodiments of the present disclosure.

In an embodiment, during training of the feature extraction model 105, the images and the corresponding ground truth labels stored in the clean training dataset (D') may be obtained, as shown in block 501 of FIG. 5. Subsequently, the plurality of local features 111 and the plurality of global features 109 may be extracted by performing the feature extraction methods shown in blocks 503 and 505 respectively. During extraction of the local features 111, high resolution images corresponding to each image in the clean training dataset (D') may be obtained as shown in block 503A. Thereafter, at block 503B, each high-resolution image may be sub-divided into a predetermined number of image patches. The predetermined number may be defined by a user of the automated assessment system 101 based on application and complexity of the training dataset (D'). As an example, the predetermined number may be 16, which means that each high-resolution image is divided into 16 image patches. In one embodiment, the patches are of equal size and/or resolution. In an embodiment, using the higher resolution image patches may be helpful in analysing finest details of the images and better training of the feature extraction model 105. After obtaining the image patches, each image patch may be analysed for extracting the plurality of local features 111 from each of the image patches, as shown in block 503C. Finally, the local features 111 from each image patch may be concatenated and/or combined to collectively obtain the local features 111 corresponding to each image in the training dataset (D').

In an embodiment, for extraction of the global features 109, lower resolution images corresponding to each image in the training dataset (D') may be obtained, as shown in block 505A. Further, at block 505B, a global feature network may be trained for assigning weights for each global feature extractor identified in each of the lower resolution images. Thereafter, the global feature extractor weights may be loaded onto the feature extractor model, as shown in block 505C. Finally, at block 505D, the plurality of global features 109 may be extracted from each lower resolution image by running the images through the feature extraction model 105.

Once the plurality of local features 111 and the plurality of global features 109 are extracted from each of the images in the training dataset (D'), each of the global features 109 and the local features 111 may be concatenated to form a combined feature set of all the features extracted from the images, as shown in block 507. Subsequently, a feature classifier 107 associated with the automated assessment system 101 may be trained with the combined feature set for determining abnormality scores 113 for the images, as shown in block 509. Finally, the feature extractor weights, and the combined feature set may be stored in the automated assessment system 101 for future training purposes.

In an embodiment, the global feature network used for assigning the weights may consist of a Deep Convolutional Neural Network (DCNN), such as DenseNet. The output of the last global average-pooling layer of the DCNN may be flattened into a 1-Dimensional vector represented by a $GF_1$. The global features are determined using a CNN network that is different from a CNN network used for determining local features. For example, a first CNN network can be used for determining the local features and a second CNN network can be used for determining the global features, wherein the first CNN network is different from the second CNN network. This allows for a freedom to choose usage of different resolutions for determining the global and local features. For example, for global features, low resolution medical images are used that allows to focus on broader or higher-level features such as texture of the ROI, pattern of the ROI, and the like. Similarly, for local features higher resolution medical images are used that allows to focus on finer details of the medical images 103.

In an embodiment, the global network may be trained with the training dataset (D'), to optimize the classification of an image, given the global features 109 only. The parameters '$W_g$' of the global branch may be optimized using a classification loss function, for example, the Binary Cross-Entropy (BCE) loss function. Further, the weights '$W_g$' of the global feature extractor alone may be then stored as pretrained weights. The pretrained weights may be loaded to extract the global features 109. The global features 109 may then be extracted for all the images in the training dataset (D') from the pretrained weights '$W_g$'.

In an embodiment, the pre-trained feature classifier 107 may consist of a series of FC layers. The output of the final FC classifier layer may be followed by a sigmoid activation for classification. The probability score for a given image I, for a class 'a' (i.e. normal or abnormal) may be represented as '$p_f(a^\sim|[GF_I, LF_I])$'. Here, '$LF_I$' represents the 1-dimensional vector obtained by flattening the features, for example, the radiomic features corresponding to the plurality of local features 111. Further, the '$W_f$' parameters of the fusion branch may be optimized using a classification loss function ($L(W_f)$), similar to the global feature network. Here, $L(W_f)$ may represent the Binary Cross-Entropy (BCE) loss of fusion classifier, following which the weights '$W_f$' may be saved.

Figure 6:
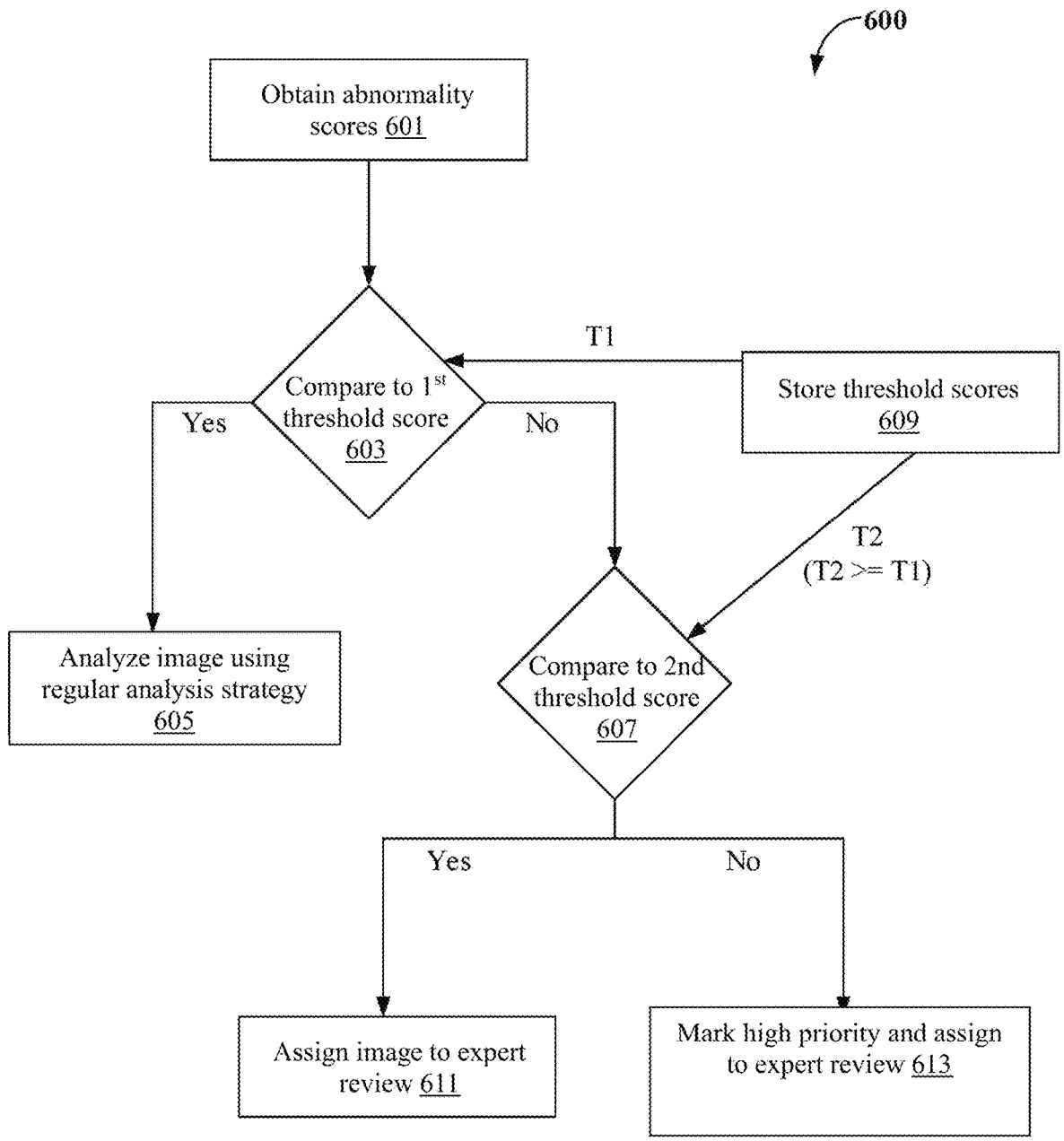
FIG. 6 shows a flowchart illustrating a method of preparing and assigning a worklist for expert analysis of the medical images in accordance with some embodiments of the present disclosure.

FIG. 6 shows a flowchart illustrating a method of preparing and assigning a worklist for expert analysis of the abnormal images 115 in accordance with some embodiments of the present disclosure.

At block 601, the abnormality scores 113 assigned to each of the medical images 103 may be obtained. Further, at block 603, the abnormality score 'S' may be compared with a predefined first threshold score T1. The value of the predefined first threshold score T1 may be defined by the user of the automated assessment system 101 and may be dynamically changed based on application and complexity of the medical images 103. In an embodiment, if the abnormality score 'S' of the medical image is less than the predefined first threshold score T1, then the medical image may be analysed using a regular analysis strategy using the automated assessment system 101, as shown in block 605. On the other hand, if the abnormality score 'S' is more than the predefined first threshold score T1, then the image may be exempted from the regular analysis process and the abnormality score 'S' may be compared against a predefined second threshold score T2, as shown in block 607. In an embodiment, the predefined second threshold score T2 may also be user defined and may be a value higher than the predefined first threshold score T1. Thus, at block 607, it is determined whether the abnormality score 'S' is between the two borderline scores T1 and T2. In an embodiment, values of the predefined first threshold score and the predefined second threshold score may be stored as a part of the worklist assignment configurations, as shown in block 609.

In an embodiment, if the abnormality score 'S' is between the threshold scores T1 and T2, then the medical image may be assigned to a highly skilled expert for analysis, as shown in block 611. Alternatively, if the abnormality score 'S' is outside the range T1 and T2 and/or beyond the value of T2, then the corresponding medical image may be marked with a higher priority and assigned to the highly skilled expert for review, as shown in block 613. In an embodiment, all the images selected for assigning to the skilled experts may be updated in the worklist.

Figure 7:
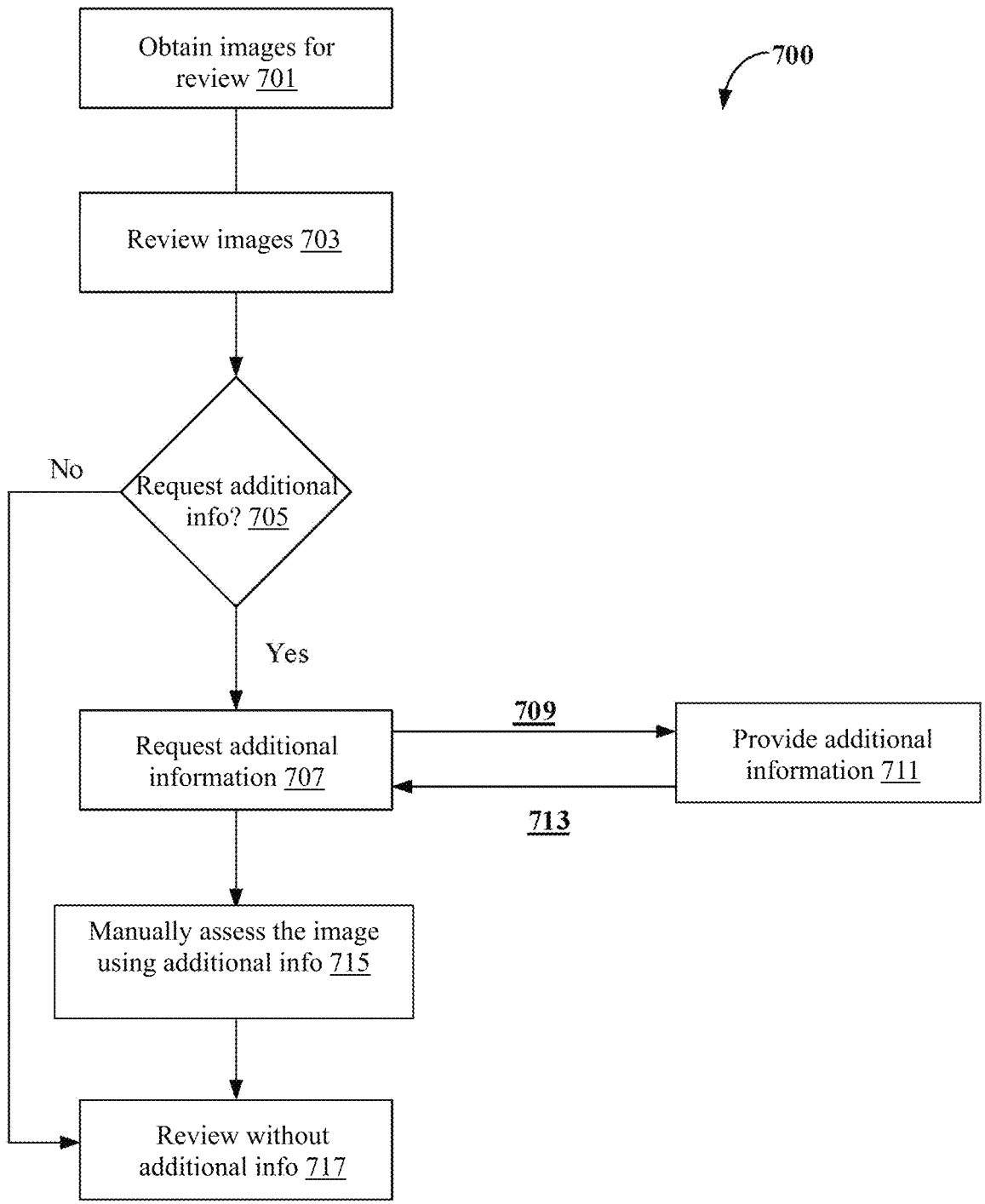
FIG. 7 shows a flowchart illustrating a method of creating an analysis report based on expert analysis of the medical images in accordance with some embodiments of the present disclosure.

FIG. 7 shows a flowchart illustrating a method of creating an analysis report based on expert analysis of the medical images 103 in accordance with some embodiments of the present disclosure.

Once the abnormal images 115 are identified and updated in the worklist, the updated worklist 301 may be provided to the expert reviewers for their review. Upon receiving the updated worklist 301, the expert analyst may obtain the medical images 103 corresponding to the entries in the worklist for manually reviewing the medical images 103, as shown in block 701. Further, the expert analyst may manually review the medical images 103 for identifying one or more pathological abnormalities from the medical images 103. In an embodiment, if the image is too complex and/or not easily analyzable, then the expert analyst may request for additional information related to the image, as shown in block 705. As an example, the additional information may include, without limiting to, abnormality score 113 of the image, highlighted review areas in the image and the like, as indicated in block 707. Alternatively, if the image is easily analyzable and/or the expert analyst does not require any additional information, the expert analyst may review and report the image without seeking the additional information, as shown in block 717.

In an embodiment, when the expert analyst requests the additional information, the requested additional information may be retrieved from the memory of the automated assessment system 101, through a query 709 sent to the memory. In response to the query 709, the requested additional information comprising the abnormality score 113 and the highlighted review areas 713 may be provided to the expert analyst, as shown in block 711. Thereafter, at block 715, the expert analyst may manually assess the image using the additional information. Finally, a report comprising review results from the expert analyst may be prepared in the form an expert report.

In an embodiment, in order to highlight the review areas causing the abnormality score 113, a guided grad-CAM may be applied on the last layer of the global feature extractor. A threshold of $T_v$ may be used to generate a binary masked image of the guided grad-CAM output. From the binary mask image, a bounding box may be created for each closed region, the coordinates of which, along with the score of abnormality, may be stored back in the memory of the automated assessment system 101, for future retrieval and viewing. As an example, value of the masking threshold $T_v$ may be set to 0.7.

Figure 8:
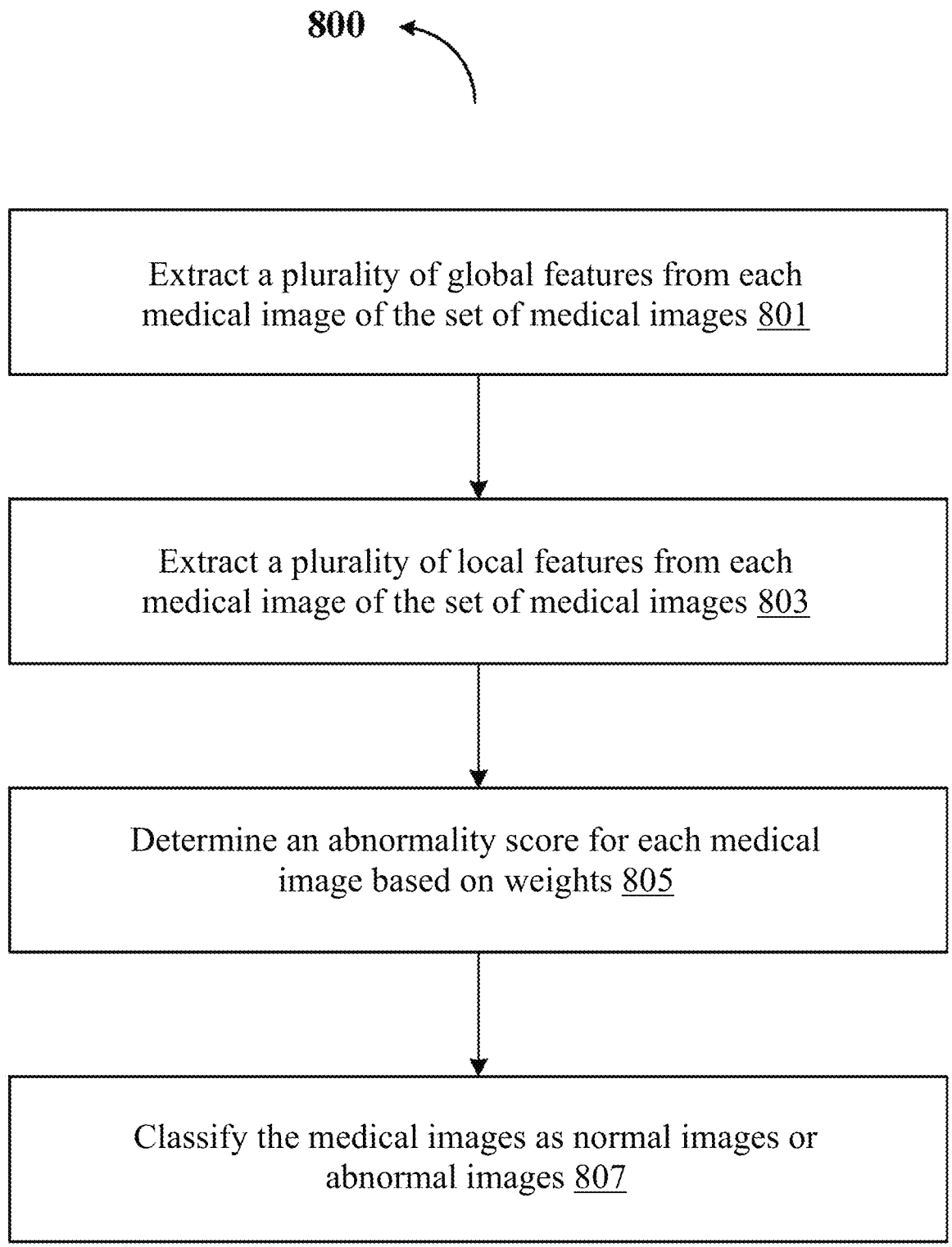
FIG. 8 shows a flowchart illustrating a method of identifying abnormal images in a set of medical images for optimal assessment of the medical images in accordance with some embodiments of the present disclosure.

FIG. 8 shows a flowchart illustrating a method of identifying abnormal images 115 in a set of medical images 103 for optimal assessment of the medical images 103 in accordance with some embodiments of the present disclosure.

As illustrated in FIG. 8, the method 800 includes one or more blocks illustrating a method for identifying abnormal images 115 in a set of medical images 103 for optimal assessment of the medical images 103 using an automated assessment system 101, illustrated in FIG. 1. The method 800 may be described in the general context of computer executable instructions. Generally, computer executable instructions can include routines, programs, objects, components, data structures, procedures, modules, and functions, which perform specific functions or implement specific abstract data types.

The order in which the method 800 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 801, the method 800 comprises extracting a plurality of global features 109 from each medical image of the set of medical images 103 based on pretrained weights associated with each of the plurality of global features 109. In an embodiment, the plurality of global features 109 and the plurality of local features 111 may be extracted using a pre-trained feature extraction model 105. In an embodiment, the pre-trained feature extraction model 105 may be trained by obtaining a plurality of train medical images and extracting ground truth labels corresponding to each of the plurality of the train medical images. Here, the ground truth labels may comprise one or more system-assigned labels and corresponding one or more expert-assigned labels. Once the ground truth labels are extracted the one or more system-assigned labels may be compared with the corresponding one or more expert-assigned labels to determine one or more matching ground truth labels. Thereafter, the one or more matching ground truth labels and corresponding train medical images may be used for training the feature extraction model 105. In an embodiment, the plurality of global features 109 may be extracted from a lower resolution image corresponding to the medical image.

At block 803, the method 800 comprises extracting a plurality of local features 111 from each medical image by analysing a predefined number of image patches corresponding to each medical image. The predefined number of image patches may be generated by obtaining a higher resolution image corresponding to each medical image and splitting each higher resolution image. In an embodiment, the resolution of the medical images used for extracting the plurality of local features 111 may be more than the resolution of the medical images used for extracting the plurality of global features 109.

At block 805, the method 800 comprises determining an abnormality score 113 for each medical image based on weights associated with a combined feature set obtained by concatenating the plurality of global features 109 and the plurality of local features 111. The abnormality score 113 may be determined using a pretrained feature classifier 107. In an embodiment, determining the abnormality score 113 for each medical image may include comparing the weights associated with the combined feature set with corresponding stored weights associated with the pretrained feature classifier 107.

In an embodiment, upon identifying the abnormality scores 113 of the medical images 103, the method 800, at block 807, comprises classifying the medical images 103 as normal images or abnormal images 115. In an embodiment, a medical image 103 may be classified as the normal image when the abnormality score 113 of the medical image 103 is less than the predefined first threshold score (T1). In such a case, the normal image may be taken through the default analysis strategy used in the hospital/organization. In an embodiment, a medical image 103 may be classified as an abnormal image 115 when the abnormality score 113 of the medical image 103 is greater than the predefined first threshold score (T1).

In an embodiment, the abnormal images 115 may be further classified as a critical abnormal image and a challenging abnormal image. As an example, an abnormal image 115 may be tagged and/or marked as a critical abnormal image when the abnormality score 113 is more than a predefined second threshold score (T2) and may be sent to an expert analyst for immediate review and/or assessment of the image. However, if the abnormality score 113 is more than the predefined first threshold score (T1) but less than the predefined second threshold score (T2), then the abnormal image 115 may be marked as a challenging abnormal image and routed to the expert analyst for assessment. In other words, an abnormal image 115 classified as the critical abnormal image may be given a higher priority than the abnormal image 115 classified as the challenging abnormal image and sent to an immediate review by the expert analyst. In an embodiment, the predefined first and the second threshold scores may be set by the expert analyst and/or a radiologist.

Computer System

Figure 9:
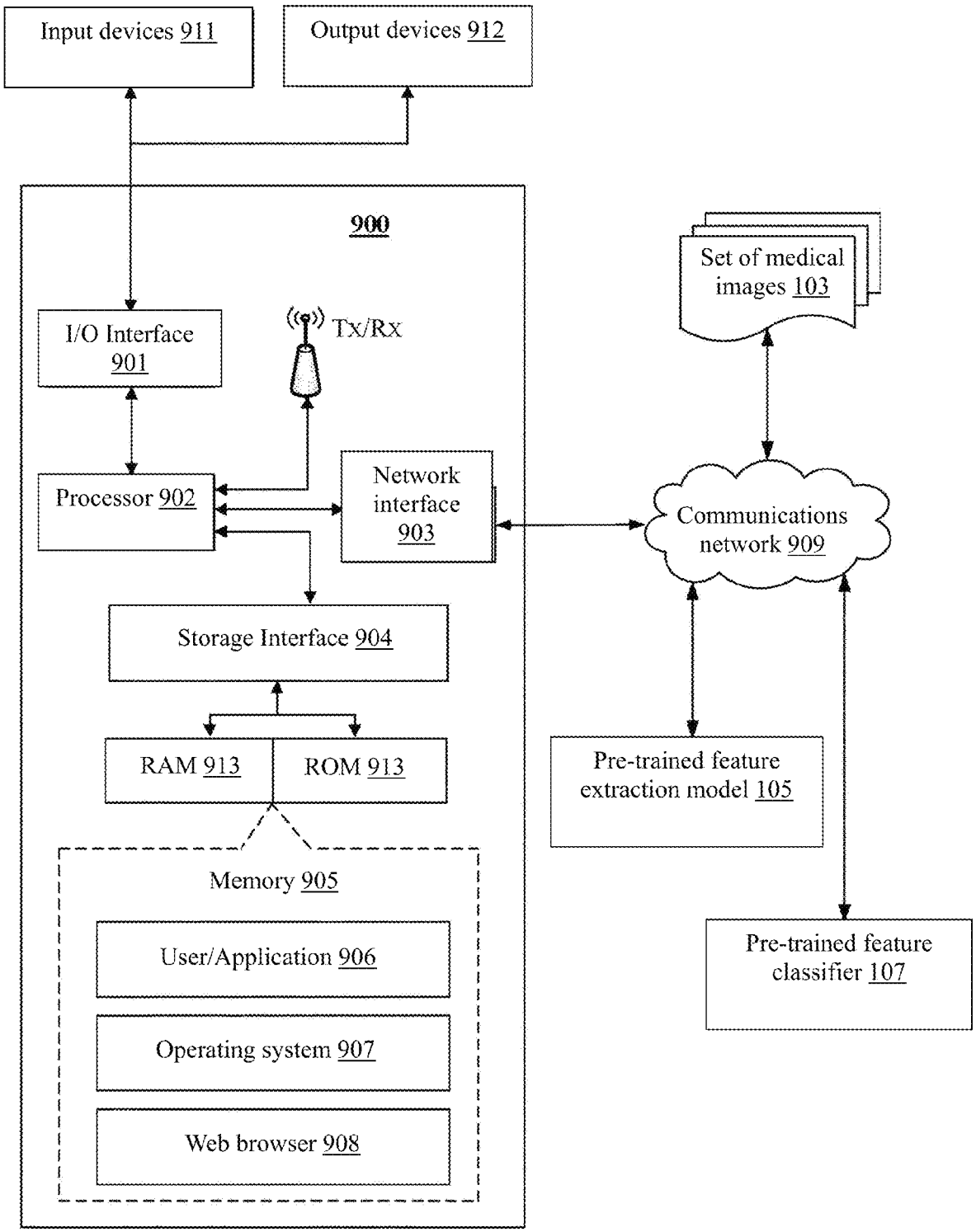
FIG. 9 illustrates a block diagram of an exemplary computer system for implementing embodiments consistent with the present disclosure.

FIG. 9 illustrates a block diagram of an exemplary computer system 900 for implementing embodiments consistent with the present disclosure. In an embodiment, the computer system 900 may be an automated assessment system 101, which is used for identifying abnormal images 115 in a set of medical images 103. The computer system 900 may include a central processing unit (Central Processing Unit (CPU), Graphics Processing Unit (GPU) or "processor") 902. The processor 902 may comprise at least one data processor for executing program components for executing user- or system-generated business processes. A user may include a person, a radiologist, a medical practitioner and/or a technologist, a person reviewing the set of medical images 103 and the like. The processor 902 may include specialized processing units such as integrated system (bus) controllers, memory management control units, floating point units, graphics processing units, digital signal processing units, etc.

The processor 902 may be disposed in communication with one or more input/output (I/O) devices (911 and 912) via I/O interface 901. The I/O interface 901 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 901, the computer system 900 may communicate with one or more I/O devices 911 and 912.

In some embodiments, the processor 902 may be disposed in communication with a communication network 909 via a network interface 903. The network interface 903 may communicate with the communication network 909. The network interface 903 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 903 and the communication network 909, the computer system 900 may communicate with an image source for receiving set of medical images 103. Further, the communication network 909 may be used to communicate with a pre-trained feature extraction model 105 and a pre-trained feature classifier 107.

The communication network 909 can be implemented as one of the several types of networks, such as intranet or Local Area Network (LAN) and such within the organization. The communication network 909 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 909 may include a variety of network devices, including routers, bridges, servers, computing devices, storage devices, etc.

In some embodiments, the processor 902 may be disposed in communication with a memory 905 (for example, RAM 913 and ROM 914 as shown in FIG. 9) via a storage interface 904. The storage interface 904 may connect to memory 905 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 905 may store a collection of program or database components, including, without limitation, user/application 906, an operating system 907, a web browser 908, and the like. In some embodiments, computer system 900 may store user/application data 906, such as the data, variables, records, and the like as described in this disclosure. Such databases may be implemented as fault-tolerant, relational, scalable, secure databases such as Oracle or Sybase.

The operating system 907 may facilitate resource management and operation of the computer system 900. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like.

A user interface may facilitate display, execution, interaction, manipulation, or operation of program components through textual or graphical facilities. For example, user interfaces may provide computer interaction interface elements on a display system operatively connected to the computer system 900, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Automated assessment system |
| 103 | Set of medical images |
| 105 | Pre-trained feature extraction model |
| 107 | Pre-trained feature classifier |
| 109 | Global features |
| 111 | Local features |
| 113 | Abnormality score |
| 115 | Abnormal image(s) |
| 201 | I/O interface |
| 203 | Processor |
| 205 | Memory |
| 207 | Data |
| 209 | Modules |
| 211 | Other data |
| 213 | Image acquisition module |
| 215 | Extraction module |
| 217 | Determining module |
| 219 | Identification module |
| 221 | Worklist assignment module |
| 223 | Other modules |
| 301 | Updated worklist |
| 303 | Viewing and reporting unit |
| 305 | Intelligent viewing module |
| 307 | Reporting module |
| 309 | Reports |
| 311 | Storage server |
| 901 | I/O Interface of the exemplary computer system |
| 902 | Processor of the exemplary computer system |
| 903 | Network interface |
| 904 | Storage interface |
| 905 | Memory of the exemplary computer system |
| 906 | User/Application |
| 907 | Operating system |
| 908 | Web browser |
| 909 | Communication network |
| 911 | Input devices |
| 912 | Output devices |
| 913 | RAM |
| 914 | ROM |

The invention claimed is:

1. A computer-implemented method of identifying abnormal images in a set of medical images for optimal assessment of the medical images, the method comprising:
extracting a plurality of global features from each medical image of the set of medical images based on pretrained weights associated with each of the plurality of global features, wherein the global features are assigned the pretrained weights using a first Convolutional Neural Network (CNN);
extracting, using a second Convolutional Neural Network (CNN) different from the first CNN, a plurality of local features from each medical image by analysing a predefined number of image patches corresponding to each medical image, wherein the predefined number of image patches are generated by obtaining a higher resolution image corresponding to each medical image and splitting each higher resolution image into the predefined number of image patches, wherein the respective image patches are analyzed to extract local features from the respective image patches, and wherein the extracted local features for the respective image patches are combined to obtain the plurality of local features, wherein a resolution of the medical image is less than a resolution of the higher resolution image;

determining an abnormality score for each medical image based on weights associated with a combined feature set obtained by concatenating the plurality of global features and the plurality of local features, wherein the abnormality score is determined using a pretrained feature classifier; and identifying the medical image as an abnormal image when the abnormality score of the medical image is higher than a predefined first threshold score.

2. The method of claim 1, wherein the plurality of global features and the plurality of local features are extracted using a pretrained feature extraction model.

3. The method of claim 2, wherein training the feature extraction model comprises:

obtaining a plurality of train medical images;

extracting ground truth labels corresponding to each of the plurality of train medical images, wherein the ground truth labels comprises one or more system-assigned ground truth labels and corresponding one or more expert-assigned labels;

comparing the one or more system-assigned ground truth labels with the corresponding one or more expert-assigned labels to determine the image classes having consensus;

extracting one or more system-predicted ground truth labels from image classes having no consensus;

comparing the one or more system-predicted ground truth labels with the corresponding system-assigned ground truth labels to determine train medical images having matching ground truth labels; and providing the one or more matching ground truth labels and the corresponding train medical images for training the feature extraction model.

4. The method of claim 1, wherein determining the abnormality score for each medical image comprises comparing the weights associated with the combined feature set with corresponding stored weights associated with the pretrained feature classifier.

5. The method of claim 1, further comprising:

classifying the abnormal image as a critical abnormal image when the abnormality score of the image is more than a predefined second threshold score, wherein the predefined second threshold score is greater than the predefined first threshold score; and classifying the abnormal image as a challenging abnormal image when the abnormality score of the abnormal image is more than the predefined first threshold score and less than the predefined second threshold score.

6. The method of claim 1, wherein identifying the abnormal image further comprises:

dynamically creating a worklist comprising each of the abnormal images; and assigning the worklist to an expert analyst for assessment of the abnormal images including one or more critical abnormal images and one or more challenging abnormal images.

7. The method of claim 6, wherein each of the one or more challenging abnormal images are provided to an expert analyst for assessment and each of the one or more critical abnormal images are flagged as priority and provided to the expert analyst for immediate assessment.

8. An automated assessment system for identifying abnormal images in a set of medical images for optimal assessment of the medical images, the automated system comprising:

a processor; and a memory, communicatively coupled to the processor, wherein the memory stores processor-executable instructions, which on execution, cause the processor to:

extract a plurality of global features from each medical image of the set of medical images based on pre-trained weights associated with each of the plurality of global features;

extract, using a second Convolutional Neural Network (CNN) different from the first CNN, a plurality of local features from each medical image by analysing a predefined number of image patches corresponding to each medical image, wherein the predefined number of image patches are generated by obtaining a higher resolution image corresponding to each medical image and splitting each higher resolution image into the predefined number of image patches, wherein the respective image patches are analyzed to extract local features from the respective image patches, and wherein the extracted local features for the respective image patches are combined to obtain the plurality of local features, wherein a resolution of the medical image is less than a resolution of the higher resolution image;

determine an abnormality score for each medical image based on weights associated with a combined feature set obtained by concatenating the plurality of global features and the plurality of local features, wherein the abnormality score is determined using a pretrained feature classifier; and identify the medical image as an abnormal image when the abnormality score of the medical image is higher than a predefined first threshold score.

9. The automated assessment system of claim 8, wherein the plurality of global features and the plurality of local features are extracted using a pretrained feature extraction model.

10. The automated assessment system of claim 9, wherein the processor trains the feature extraction model by:

obtaining a plurality of train medical images;

extracting ground truth labels corresponding to each of the plurality of train medical images, wherein the ground truth labels comprises one or more system-assigned ground truth labels and corresponding one or more expert-assigned labels;

comparing the one or more system-assigned ground truth labels with the corresponding one or more expert-assigned labels to determine the image classes having consensus;

extracting one or more system-predicted ground truth labels from image classes not having consensus;

comparing the one or more system-predicted ground truth labels with the corresponding system-assigned ground truth labels to determine one or more images having matching ground truth labels; and providing the one or more matching ground truth labels and corresponding the train medical images for training the feature extraction model.

11. The automated assessment system of claim 8, wherein the processor determines the abnormality score for each medical image by comparing the weights associated with the combined feature set with corresponding stored weights associated with the pretrained feature classifier.

12. The automated assessment system of claim 8, wherein the processor is further configured to:
   classify the abnormal image as a critical abnormal image when the abnormality score of the image is more than a predefined second threshold score, wherein the predefined second threshold score is greater than the predefined first threshold score; and
   classify the abnormal image as a challenging abnormal image when the abnormality score of the abnormal image is more than the predefined first threshold score and less than the predefined second threshold score.

13. The automated assessment system of claim 8, wherein identifying the abnormal image further comprises:
   dynamically creating a worklist comprising each abnormal image; and
   assigning the worklist to an expert analyst for assessment of the abnormal images including one or more critical abnormal images and one or more challenging abnormal images.

14. The automated assessment system of claim 13, wherein each of the one or more challenging abnormal images are provided to an expert analyst for assessment and each of the one or more critical abnormal images are flagged as priority and provided to the expert analyst for immediate assessment.

15. A non-transitory computer-readable storage medium comprising instructions that, when executed by a processor, cause the processor to identify abnormal images in a set of medical images for optimal assessment of the medical images, comprising:

extracting a plurality of global features from each medical image of the set of medical images based on pretrained weights associated with each of the plurality of global features, wherein the global features are assigned the pretrained weights using a first Convolutional Neural Network (CNN);

extracting, using a second Convolutional Neural Network (CNN) different from the first CNN, a plurality of local features from each medical image by analysing a predefined number of image patches corresponding to each medical image, wherein the predefined number of image patches are generated by obtaining a higher resolution image corresponding to each medical image and splitting each higher resolution image into the predefined number of image patches, wherein the respective image patches are analyzed to extract local features from the respective image patches, and wherein the extracted local features for the respective image patches are combined to obtain the plurality of local features, wherein a resolution of the medical image is less than a resolution of the higher resolution image;

determining an abnormality score for each medical image based on weights associated with a combined feature set obtained by concatenating the plurality of global features and the plurality of local features, wherein the abnormality score is determined using a pretrained feature classifier; and identifying the medical image as an abnormal image when the abnormality score of the medical image is higher than a predefined first threshold score.

\* \* \* \* \*